US005298734A

United States Patent [19]

Kokubo

[11] Patent Number: 5,298,734

[45] Date of Patent: Mar. 29, 1994

[54] SOLID STATE IMAGE PICKUP APPARATUS WITH SHUTTER SIGNAL AND OVERFLOW DRAIN

[75] Inventor: Yuji Kokubo, Kanagawa, Japan

[73] Assignee: Sony Corporation, Tokyo, Japan

[21] Appl. No.: 18,204

[22] Filed: Feb. 16, 1993

[30] Foreign Application Priority Data

Feb. 18, 1992 [JP] Japan .................................. 4-060997

[51] Int. Cl.[5] .................................................. H01J 40/14

[52] U.S. Cl. .................................. 250/208.1; 348/322

[58] Field of Search .......................... 250/208.1, 208.2; 358/213.19, 213.26, 213.31, 231.13

[56] References Cited

U.S. PATENT DOCUMENTS 4,633,075 12/1986 Sakai et al. ........................ 250/208.1

5,027,218 6/1991 Ueda .............................. 358/213.26

*Primary Examiner*—David C. Nelms

*Attorney, Agent, or Firm*—Lewis H. Eslinger; Jay H. Maioli

[57] ABSTRACT

A solid-state image pickup apparatus employing a frame interline transfer type solid-state image sensor. The operation of a driving circuit is controlled by a controller in such a manner that image pickup charges produced by photosensitive elements are drained in a charge draining section at a drain timing during a vertical blanking period, and image pickup charges produced by the photosensitive elements in an image pickup unit after lapse of a predetermined light exposure period since the drain timing are transferred to a vertical transfer register so as to be transferred by high speed transfer from the image pickup unit to a storage unit during the next vertical blanking period so that the image pickup charges are read out line sequentially during the imaging period via horizontal transfer registers. The apparatus maintains a constant start timing of the effective light exposure period and produces video signals synchronized with external synchronization signals.

3 Claims, 4 Drawing Sheets

SOLID STATE IMAGE PICKUP APPARATUS WITH SHUTTER SIGNAL AND OVERFLOW DRAIN

BACKGROUND OF THE INVENTION

This invention relates to a solid state image pickup apparatus employing a frame interline transfer type solid state image sensor and, more particularly, to a solid state image apparatus having the function of a so-called electronic shutter.

A solid state image sensor such as CCD (charge coupled device) image sensor, has advantageous features such that it is free of burning or residual images as compared to an image pickup tube device, it is highly shock-proof, and lends itself to miniaturization of video cameras. In video cameras conforming to the standard television systems, such as NTSC systems employing an interlace scanning system, a CCD image sensor is employed in which image signals from pixels of odd-numbered fields and those from pixels of even-numbered fields are read out alternately at intervals of one-field periods (one-sixtieth of a second in the case of the NTSC system).

The solid state image sensor, such as the above-described CCD image sensor, may be classified, according to the type of the transfer structure used for outputting image pickup electrical charges, into a frame transfer type, interline transfer type and a frame interline transfer type. In the interline transfer type CCD image sensor, for example, one-field image pickup charges, produced by the photosensitive elements, are transferred at intervals of one-field periods to vertical transfer registers by sensor gate pulses so as to be read out line-sequentially from the vertical transfer register via horizontal transfer registers.

On the other hand a so-called progressive scan CCD or PS CCD image sensor, in which a horizontal transfer gate for two horizontal lines is provided so that image pickup signals from pixels of odd-numbered fields and those from pixels of even-numbered fields are read out in their entirety during a one-field period, has been presented for use in high-resolution video cameras, such as in high-vision television systems.

Besides, there is also presented a CCD image sensor of the type having the function of an electronic shutter for controlling effective charge storage periods of the photosensitive elements electronically. With the CCD image sensor having the function of the electronic shutter, a shutter control pulse is applied to its substrate for sweeping out image pickup charges of the photosensitive elements in an overflow drain for controlling the light exposure time, that is the effective charge storage period, as shown in FIG. 4. In this figure, a shutter control pulse $\phi SP_{1/1000}$ which will give an effective charge storage period $T_{1/1000}$ of a duration of 1/1000 second, and a shutter control pulse $\phi SP_{1/700}$ which will give an effective charge storage period of a duration of 1/700 second, are shown. Time intervals beginning at $t_1$ and $t_2$ and ending at $t_0$, the time of the first one of the sensor gate pulses $\phi SG$, yield effective storage periods $T_{1/1000}$ and $T_{1/700}$, respectively.

In the conventional CCD image sensor, having the function of the electronic shutter, the end timing of the effective charge storage period or the effective exposure period is the timing $\pm$ of the sensor gate pulse $\phi SG$, such that the end timing of the effective light exposure period is constant for any shutter speed, with the start timing of the effective exposure period being changed with the shutter speeds. Conversely, with shutter control of a mechanical optical shutter in an optical camera employing a halide film, light exposure is started on actuation of a shutter release so that light exposure is terminated at a timing associated with the shutter speed.

The electronic shutter control in the CCD image sensor is related in an inverse fashion with the shutter control in the optical shutter in an optical camera, so that, in a solid state image pickup device employing the CCD image sensor having the function of the electronic shutter for photographing still images, the start timing of the effective light exposure period tends to be delayed with respect to the shutter release operating timing, so that the opportunity of shutter actuation tends to be lost. In industrial application, if it is attempted to actuate the function of the electronic shutter in photographing an object conveyed on a transfer line, the start timing of the effective light exposure period is delayed, thus rendering it difficult to photograph the object reliably.

Besides, with the electronic shutter function in the above-described CCD image sensor, since shutter control is made by applying a shutter control pulse to its substrate, a noise known as a shutter step (step-like fluctuations in substrate voltage caused by electronic shutter operation in each horizontal blanking period) is produced in a known manner at a boundary of the shutter control pulse. Such deterioration in the picture quality is also produced by shutter step when the CCD image sensor is used in a video camera.

The U.S. Pat. No. 4,984,002, assigned to the present assignee, has been proposed for overcoming the aforementioned problem. In accordance with this prior-art system, the time which elapses between application of a trigger signal until the next vertical synchronization signal is issued is controlled for maintaining the constant start timing of the effective exposure interval.

It is noted that the video camera proposed in accordance with the present invention is frequently put to practical application, in which case it is frequently desired to supply external synchronization signals to a video camera for synchronizing video signals thereto.

With the system of the U.S. Pat. No. 4,984,002, since the timing of the next vertical synchronization signal is determined by the timing of the trigger signal, video signals synchronized to the external synchronization signals can not be produced.

OBJECT AND SUMMARY OF THE INVENTION

It is an object of the present invention to provide a solid state image pickup apparatus whereby the start timing of the effective exposure time may be maintained constant and whereby video signals can be produced that can be synchronized with the external synchronization signals.

The present invention provides a solid-state image pickup apparatus comprising a solid-state image sensor having a plurality of photosensitive elements arranged in a matrix of rows and columns for accumulating electrical charges responsive to incident light thereon a plurality of vertical shift registers each coupled to a column of the photosensitive elements for receiving electrical charges from the photosensitive elements responsive to a sensor gate signal, memory means coupled to the vertical shift registers for receiving electrical charges from the vertical shift registers responsive to a first transfer signal, horizontal shift register means coupled to the memory means for receiving electrical charges from said memory means responsive to a second transfer signal for outputting electrical charges from the solid-state image sensor column by column, an overflow drain coupled to the photosensitive elements for receiving electrical charges from the photosensitive elements responsive to a shutter signal for draining the electrical charges accumulated in the photosensitive elements in their entirety, and driving means for supplying the shutter signal, sensor gate signal and the first and second transfer signals to the solid-state image sensor. The driving means supply the shutter signal to the image sensor for draining any ineffective electric charges accumulated in said photosensitive elements, and the sensor gate signals are supplied after the lapse of an effective accumulating period after the supply timing of the shutter signal for transferring the effective electrical charges accumulated in the photosensitive elements to the vertical shift registers. The first transfer signal is supplied before the supply timing of the shutter signal within a current vertical blanking period so that the effective electrical charges transferred to the vertical shift registers responsive to the shutter signal issued during a preceding vertical blanking period are transferred to the memory means, while the second transfer signal is supplied during a period defined by the supply timing of the shutter signal during the current blanking period and the supply timing of the first transfer signal supplied next to said current shutter signal, so that the effective electric charges are transferred to an output column by column.

Other objects and advantages of the present invention will become apparent from the following description of the preferred embodiments and the claims.

DETAILED DESCRIPTION OF THE PREFERRED EMBODIMENT

Figure 1:
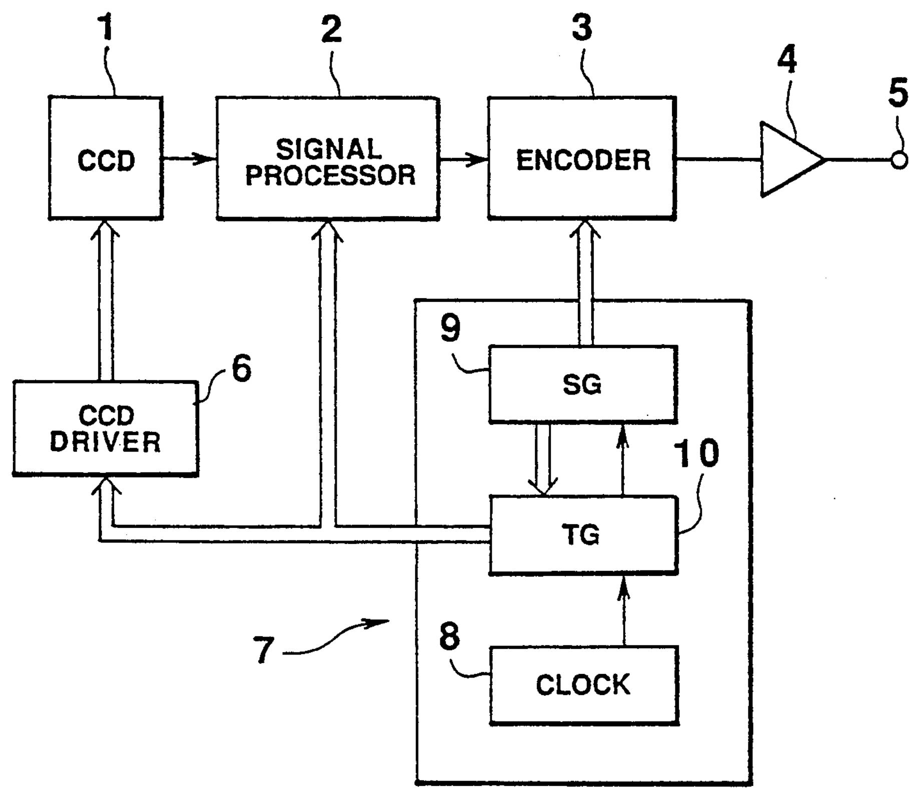
FIG. 1 is a block diagram showing the construction of a solid state image pickup apparatus according to an embodiment of the present invention.

Referring to the drawings, an illustrative embodiment of the present invention will be explained in detail.

The solid-state image pickup apparatus according to the present invention is arranged as shown for example in the block diagram of FIG. 1.

The solid state image pickup apparatus, shown in FIG. 1, comprises a 2-line readout type CCD image sensor 1, a signal processor 2 supplied with two lines of image signals read out simultaneously from the CCD image sensor 1, an encoder 3 supplied with the image signals processed by signal processor 2, an output buffer 4 for outputting the video signals outputted from encoder 3 at an output terminal 5, a CCD driving circuit 6 for driving the CCD image sensor 1, and a controller 7 for controlling the operation of these units 1 to 6.

Figure 2:
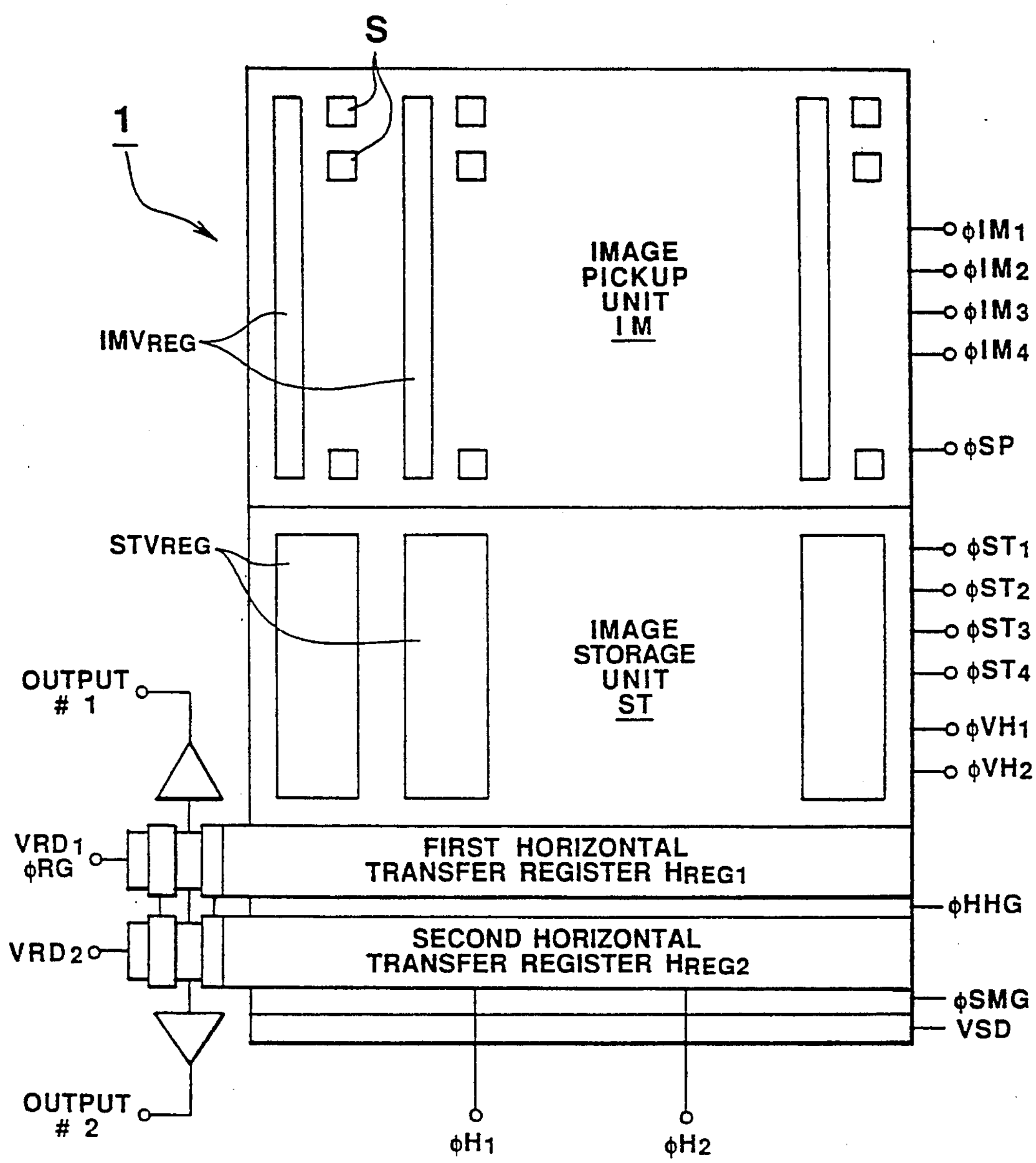
FIG. 2 is a schematic plan view showing the construction of a frame interline transfer CCD image employed in the solid image pick-up apparatus shown in FIG. 1.

The above CCD image sensor is a frame interline transfer (FIT) type CCD image sensor comprising an image pickup unit IM which is a matrix array of photosensitive elements S, such as photodiodes, on an image pickup surface, associated with pixels of odd-numbered fields and pixels of even-numbered fields, and an image storage unit ST to which electrical charges produced by the photosensitive elements S are transferred via vertical transfer registers $IMV_{REG}$, as shown in FIG. 2. That is, the image sensor is a progressive scan (PS) CCD image sensor in which two lines of electrical charges produced by the photosensitive elements S are read out simultaneously from the storage unit ST via two horizontal transfer registers $H_{REG1}$, $H_{REG2}$ for outputting electrical charges for the totality of pixels, that is the pixels of one frame or two fields, as image pickup signals, for each field, by way of reading out two lines of the electrical charges simultaneously. With this progressive scan type image sensor 1, a smear drain VSD is provided via a smear gate SMG along the horizontal transfer register $H_{REG2}$ for draining smear components. The PS type image sensor 1 having such smear drain has already been put by the present Assignee to practical application.

The signal processor 2 processes the image pickup signals for two lines read out simultaneously from CCD image sensor 1 with, for example, gamma correction, to produce image pickup signals line by line which are supplied to the above-mentioned encoder 3 where video signals conforming to the prescribed television system are generated from the line by-line image pickup signals supplied from the signal processor 2. The video signals produced as an encoder output are outputted at an output terminal 5 via a 75 ohms output impedance output buffer 4.

The controller 7 comprises a clock generator for generating system clocks for the solid state image pickup apparatus, a synchronization signal generator g for supplying synchronization signals and blanking signals to encoder 3, and a timing signal generator 10 for supplying various timing signals to signal processor 2 and to CCD driving circuit 6. The CCD driving circuit generates, based on timing signals supplied from timing signal generator 10, a shutter control pulse $\phi SP$ for draining image pickup charges obtained from respective photoelectric converting elements S in the image pickup unit IM to an overflow drain, sensor gate pulses $\phi SG_1$, $\phi SG_2$ for transferring image pickup charges generated by the photosensitive elements S in the image pickup unit Im to vertical transfer registers $IMV_{REG}$, vertical transfer pulses $\phi IM_1$ to $\phi IM_4$ for vertically transferring signal charges in the vertical transfer registers $IMV_{REG}$ in the image pickup unit IM, vertical transfer pulses $\phi ST_1$ to $\phi ST_4$ for vertically transferring signal charges in the vertical transfer registers $STV_{REG}$ in the storage unit ST, to horizontal transfer registers $H_{REG1}$, $H_{REG2}$, transfer pulses $\phi VH_1$, $\phi VH_2$ for transferring signal charges from vertical transfer register $STV_{REG}$ in the storage unit to horizontal transfer registers $H_{REG1}$ and $H_{REG2}$, vertical transfer gate pulses $\phi HHG$ for vertically transferring signal charges from the first horizontal transfer register $H_{REG1}$ to second horizontal transfer register $H_{REG2}$, smear gate pulses $\phi SMG$ for opening the smear gate SMG for draining smear components in the smear drain VSD and horizontal transfer pulses $\phi H_1$, $\phi H_2$ for horizontally transferring signal charges in the horizontal transfer register $H_{REG1}$ and $H_{REG2}$, to supply these pulses to the CCD image sensor 1.

Figure 3:
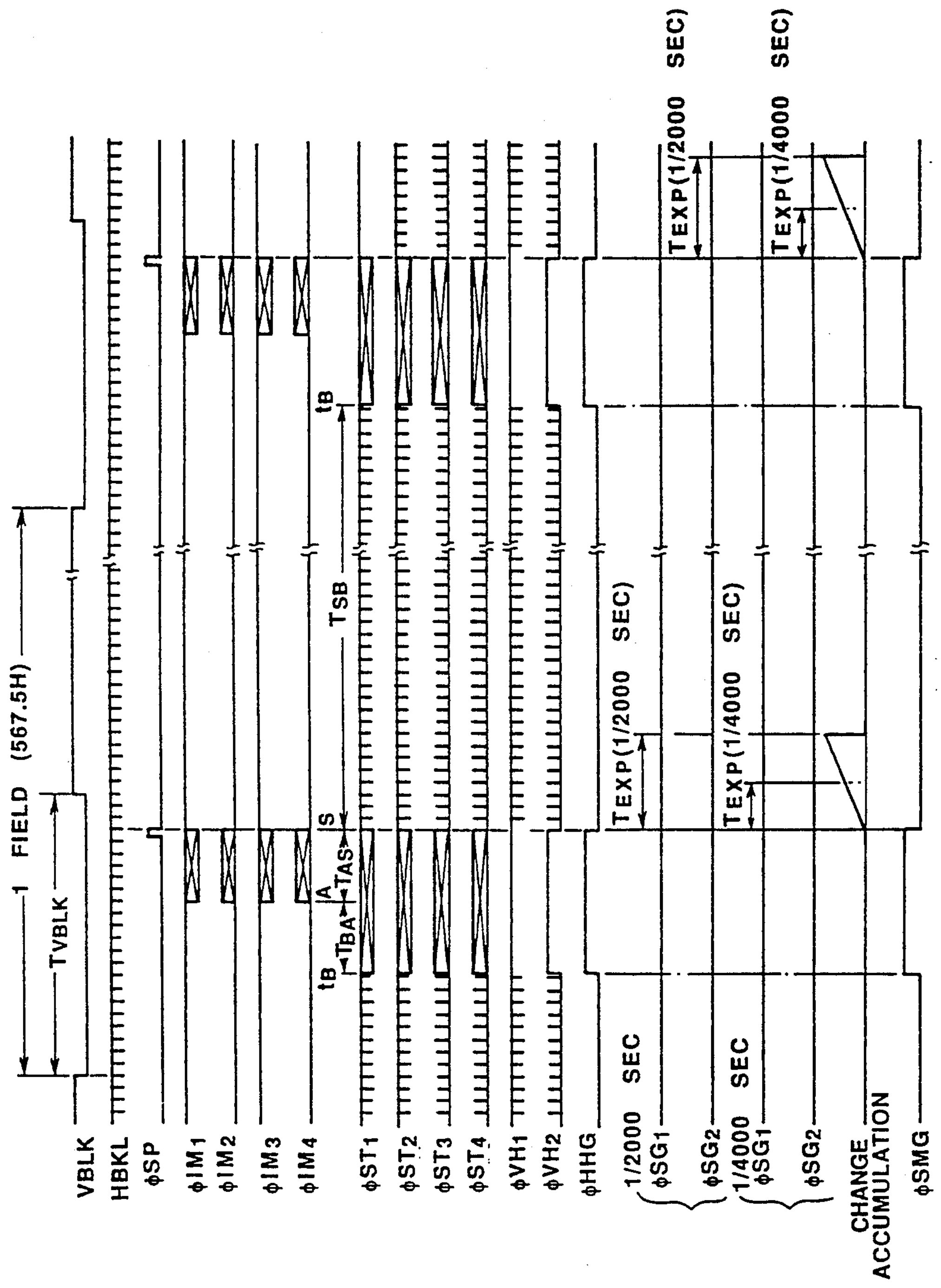
FIG. 3 is a timing chart for illustrating the operation of the solid-state image pickup apparatus shown in FIG. 1.
Figure 4:
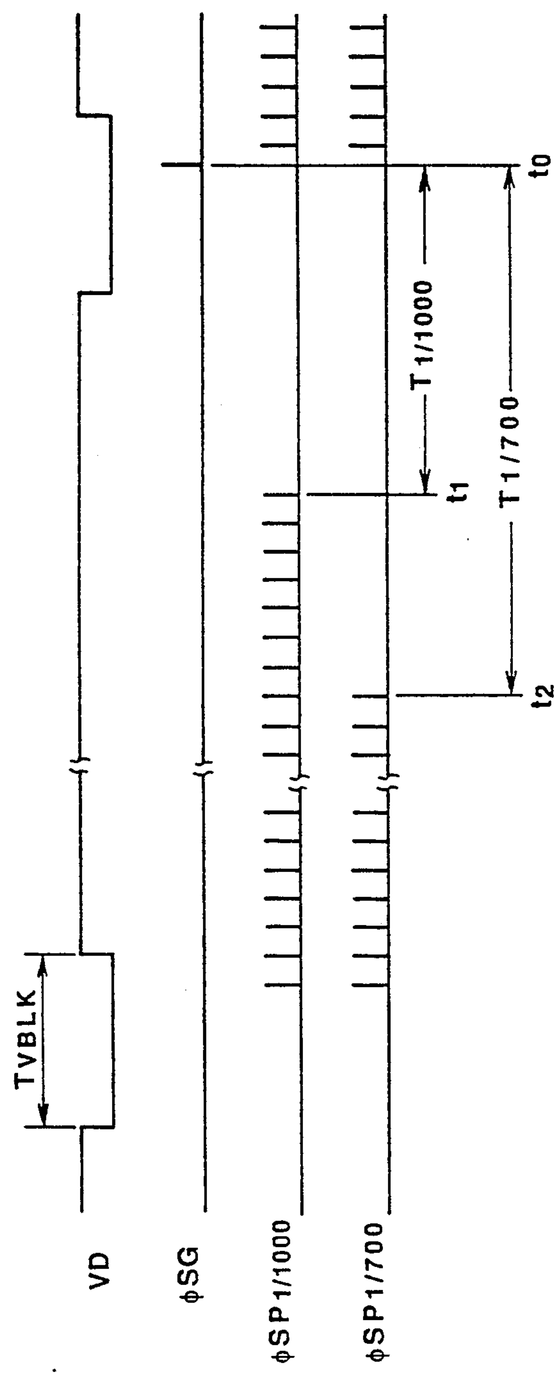
FIG. 4 is a timing chart for illustrating the operation of a conventional solid-state image pickup apparatus employing a solid-state image sensor having a function of an electronic shutter.

The controller 7 performs the following control operations: The solid state image pickup apparatus performs an image pickup operation of 562.5 lines/field and 60 field/second image pickup operation in conformity to the high vision system. The synchronization signal generator 9 supplies the synchronization signals and blanking signals having the timing set in accordance with the high-vision system to encoder 3. On the other hand, the timing signal generator 10 supplies various timing signals to the signal processor 2 or to the CCD driving circuit 6 in a timed relation with synchronization signals conforming to the high-vision system generated by the synchronization signal generator 9, as shown in FIG. 3.

At a timing $t_S$ towards the end of the high-speed transfer during the vertical blanking period $T_{VBLK}$, the CCD driving circuit 6 supplies a sole shutter control pulse $\phi SP$ to the substrate of the CCD image sensor 1. This shutter control pulse $\phi SP$ causes image pickup charges generated in the respective photoelectric converting elements S in the image pickup unit IM to be swept off in the overflow drain. The shutter control pulse $\phi SP$ is of a pulse width sufficient to sweep off the image charges in the photosensitive elements S in the overflow drain. Since the shutter control pulse $\phi SP$ is generated in this manner at a predetermined timing within the vertical blanking period $T_{VBLK}$ without dependency upon the shutter speed it is not responsible for deterioration in the picture quality otherwise caused by the shutter step.

After lapse of a predetermined exposure period $T_{EXP}$ since the timing of the shutter control pulse $\phi SP$, the CCD driving circuit 6 supplies sensor gate pulses $\phi SG_1$ and $\phi SG_2$ to the sensor gate of the image pickup unit IM.

This causes image pickup charges accumulated in the photosensitive elements S in the image pickup unit IM since the timing $t_S$ of the shutter control pulse $\phi SP$ to be transferred to the vertical transfer register $IMV_{REG}$ at the timings $SG_1$, $SG_2$. That is, the image pickup charges, obtained during a predetermined light exposure period $T_{EXP}$, with the timing $t_S$ of the shutter control pulse $\phi SP$ as the light exposure start timing, are transferred from the respective photosensitive elements S of the image pickup unit IM to the vertical transfer register $IMG_{REG}$. The start timing of the light exposure period $T_{EXP}$, that is the effective charge accumulation period, is the timing $t_S$ of the shutter control pulse $\phi SP$ and hence is constant. Meanwhile, FIG. 3 shows the sensor gate pulses $\phi SG_1$ and $\phi SG_2$ for the light exposure period of 1/2000 sec, as well as showing the sensor gate pulses $\phi SG_1$ and $\phi SG_2$ for the light exposure period of 1/4000 second.

Besides, during the high-speed transfer period $T_{AS}$ since timing $t_A$ until $t_S$ comprised within the vertical blanking period $T_{VBLK}$, the CCD driving circuit 6 transmits high-speed vertical transfer pulses $\phi IM_1$ to $\phi IM_4$ and $\phi ST_1$ and $\phi ST_4$ to the vertical transfer register $IMV_{REG}$ and the vertical transfer register $STV_{REG}$ of the storage unit ST.

This causes the image pickup charges transferred at the timings of the sensor gate pulses $\phi SG_1$, $\phi SG_2$ from the photosensitive elements S of the image pickup unit Im to the vertical transfer register $IMV_{REG}$ to be transferred from the vertical transfer register $IMV_{REG}$ of the image pickup unit IM to the vertical transfer register $STV_{REG}$ of the storage unit ST at an elevated transfer speed during the high-speed transfer period $T_{AS}$.

A high speed transfer period $T_{BA}$ is provided ahead of the high-speed transfer period $T_{AS}$. During this high-speed transfer period $T_{BA}$, the high speed transfer pulses $\phi ST_1$ to $\phi ST_4$ are supplied from the CCD driving circuit 6 to the vertical transfer register $STV_{REG}$ of the storage unit ST. Opening the vertical transfer gate HHG by the vertical transfer gate pulse $\phi HHG$ during the high speed transfer periods $T_{AS}$ and $T_{BA}$, and also opening the smear gate SMG by the smear gate pulse $\phi SMG$ causes ineffective charges in the vertical transfer register $STG_{REG}$ in the storage unit ST to be swept off from the horizontal transfer register $H_{REG}$ via smear gate SMG to smear drain VSD while causing ineffective charges transferred at a high speed to the vertical transfer register $STV_{REG}$ of the storage unit ST during the high speed transfer period $T_{BA}$ to be swept off from the horizontal transfer register $HE_{REG}$ via the smear gate SMG to the smear drain VSD during the next following high-speed transfer period.

During the normal transfer period $T_{SB}$ excluding the high-speed transfer periods $T_{AS}$, $T_{BA}$, the CCD driving circuit 6 transmits one vertical transfer pulse $ST_1$ to $ST_4$ for each H period, while transmitting transfer pulses $\phi VH_1$, $\phi VH_2$, transmitting signal charges from the vertical transfer registers $STV_{REG1}$ of the storage unit ST to the horizontal transfer registers $H_{REG1}$ and $H_{REG2}$ at each H period to the transfer gate, not shown. The signal charges transferred at a high speed to the vertical transfer registers $STV_{REG}$ of the storage unit ST are read out during the ordinary transfer period $T_{SB}$ via the horizontal transfer register $H_{REG1}$ and $H_{REG2}$. During this readout period, the smear gate SMG is opened.

The image pickup output signals, read out in this manner from the solid-state image sensor 1, are supplied via signal processor 2 to encoder 3 and thereby encoded into video signals conforming to the high-vision system before being outputted at output terminal 6 via output buffer 4.

Although the image pickup operation conforming to the high-vision system has been described in the foregoing it is also possible to generate video signals conforming to the NTSC system from the image pickup signals read out from the CCD image sensor 1.

What is claimed is:

1. A solid-state image pickup apparatus comprising:

a solid-state image sensor having a plurality of photosensitive elements arranged in a matrix of rows and columns for accumulating electrical charges responsive to incident light thereon;

a plurality of vertical shift registers each coupled to a column of said photosensitive elements for receiving electrical charges from said photosensitive elements responsive to a sensor gate signal;

memory means coupled to said plurality of vertical shift registers for receiving electrical charges from said plurality of vertical shift registers responsive to a first transfer signal;

horizontal shift register means coupled to said memory means for receiving electrical charges from said memory means responsive to a second transfer signal for outputting electrical charges from said solid-state image sensor column by column;

an overflow drain coupled to said photosensitive elements for receiving electrical charges from said photosensitive elements responsive to a shutter signal for draining the electrical charges accumulated in said photosensitive elements in their entirety; and driving means for supplying said shutter signal, said sensor gate signal and said first and second transfer signals to said solid-state image sensor, said driving means supplying said shutter signal to said image sensor for draining any ineffective electric charges accumulated in said photosensitive elements, wherein said sensor gate signals are supplied after lapse of an effective accumulating period since the supply of said shutter signal for transferring effective electrical charges accumulated in said photosensitive elements to said vertical shift registers, and wherein said first transfer signal is supplied before the supply of said shutter signal within a current vertical blanking period so that the effective electrical charges transferred to said vertical shift registers responsive to the shutter signal issued during a preceding vertical blanking period are transferred to said memory means, and said second transfer signal is supplied during a period defined by the supply of said shutter signal during the current blanking period and the supply of the next transfer signal supplied so that the effective electric charges are transferred to an output column by column.

2. The solid-state image pickup apparatus as defined in claim 1 wherein the supply timing of said sensor gate signal is variable.

3. The solid-state image pickup apparatus as defined in claim 1 wherein said sensor gate signal is alternately supplied by said driving means to an odd column and then to an even column of the matrix of said photosensitive elements.

* * * * *